(12) United States Patent
Sasao

(10) Patent No.: US 9,323,251 B2
(45) Date of Patent: Apr. 26, 2016

(54) FLOW CONTROL VALVE AND FLOW CONTROL SYSTEM USING SAME

(71) Applicant: ADVANCE DENKI KOGYO KABUSHIKI KAISHA, Kasugai-shi, Aichi-ken (JP)

(72) Inventor: Kimihito Sasao, Kasugai-shi (JP)

(73) Assignee: ADVANCE DENKI KOGYO KABUSHIKI KAISHA, Aichi-ken (JP)

( * ) Notice: Subject to any disclaimer, the term of this patent is extended or adjusted under 35 U.S.C. 154(b) by 69 days.

(21) Appl. No.: 14/458,490

(22) Filed: Aug. 13, 2014

(65) Prior Publication Data
US 2015/0101686 A1     Apr. 16, 2015

(30) Foreign Application Priority Data
Oct. 11, 2013   (JP) .................................. 2013-213919

(51) Int. Cl.
*G05D 7/01*     (2006.01)

(52) U.S. Cl.
CPC ........... *G05D 7/012* (2013.01); *Y10T 137/7791* (2015.04); *Y10T 137/87981* (2015.04)

(58) Field of Classification Search
CPC ................. G05D 7/012; G05D 7/0133; Y10T 137/7791; Y10T 137/7784; Y10T 137/7787; Y10T 137/7788; Y10T 137/7789; Y10T 137/7792; Y10T 137/7782; Y10T 137/87981
USPC ......... 137/503, 497, 500, 501, 502, 504, 495, 137/641.11
See application file for complete search history.

(56) References Cited

U.S. PATENT DOCUMENTS

| | | | | |
|---|---|---|---|---|
| 3,999,528 A | * | 12/1976 | Knapp ................... | F02M 69/52 137/501 |
| 5,329,966 A | * | 7/1994 | Fenimore ............. | G05D 7/0635 137/501 |
| 6,805,156 B2 | | 10/2004 | Sasao | |
| 2003/0116196 A1 | * | 6/2003 | Sasao ....................... | G05D 7/03 137/501 |
| 2007/0056640 A1 | | 3/2007 | Matsuzawa et al. | |

FOREIGN PATENT DOCUMENTS

EP    1 321 841 B1   6/2014

* cited by examiner

*Primary Examiner* — Michael R Reid
(74) *Attorney, Agent, or Firm* — Cheng Law Group, PLLC

(57) ABSTRACT

A flow control valve has a valve body part which has a pressure differential device part and a valve seat, a first diaphragm which defines first and second chambers, a second diaphragm which defines third and fourth chambers and is provided with a valve element, a first moving part which advances and retracts together with the first diaphragm, and a second moving part which advances and retracts together with the second diaphragm; the second chamber and the fourth chamber form between them a connecting chamber, an intermediate transmission member which transmits movements of the first and second moving parts to each other is arranged, and a pressure differential control valve element which advances and retracts with respect to the pressure differential opening part and a pressure differential control valve element advancing/retracting means for making the pressure differential control valve element advance and retract are provided, and a flow control system using the same.

11 Claims, 10 Drawing Sheets

Fig. 6

FLOW CONTROL VALVE AND FLOW CONTROL SYSTEM USING SAME

BACKGROUND OF THE INVENTION

1. Field of the Invention

The present invention relates to a flow control valve and to a flow control system which uses the same, more particularly relates to a flow control valve which is provided with a function of enabling change to a predetermined fluid flow amount (flow rate) and of maintaining the fluid flow amount constant after change and to a flow control system which is provided with that flow control valve.

2. Description of the Related Art

In the process of production of semiconductors, the surface of a silicon wafer (substrate) is cleaned by a diluted chemical. This is aimed at removing particles and metal contaminants, oxide films, etc. A treatment solution which is obtained by mixing a plurality of types of chemicals and pure water by a suitable ratio is used. For the treatment solution, APM (ammonia/peroxide mixture, containing ammonium hydroxide, hydrogen peroxide, and pure water), HPM (hydrochloric/peroxide mixture, containing hydrochloric acid, hydrogen peroxide, and pure water), DHF (dilute hydrofluoric acid, containing hydrofluoric acid and pure water), SPM (sulfuric/peroxide mixture, containing sulfuric acid and hydrogen peroxide), etc. may be mentioned. For example, when this cleaning treatment is performed at a single wafer type system, the treatment solution etc. are supplied to the surface of a spinning wafer which is held horizontally.

In single wafer type cleaning systems, there are a cabinet type where the mixed treatment solution is stored in a tank and the treatment solution is supplied to the wafer and an in-line mixing type where a treatment solution which is mixed right in before the wafer is directly supplied. Such a latter system has a fluid mixing part. Pipes through which a high concentration chemical (concentrate) and pure water flow are connected to it whereby a mixed solution is prepared. In a single wafer type system which treats one wafer at a time, the mixed solution which is supplied to the wafer surface is small in amount. When using the in-line type, the chemical which is supplied to the mixing part is small in amount. For example, if producing DHF, the ratio of flow amounts of hydrofluoric acid and pure water is 1:100. If the flow amount of pure water is set to 2.0 liter/min, the flow amount of hydrofluoric acid required becomes 0.02 liter/min. In treatment requiring control of such a fine amount of chemical, a slight change in the flow amount ends up causing a large difference in the cleaning effect. For this reason, constant flow valves which can supply a mixing part with a chemical and pure water with a high precision become necessary.

Further, in semiconductor production, larger scale integration and finer processing are being pursued. In the International Technology Roadmap for Semiconductors (ITRS), achievement of a 24 nm process is targeted for 2014. The target figure which is expressed by this process (24 nm) is defined as half of the narrowest pitch of lines at the bottommost layer in an MPU (line width+line interval) (half pitch). With a line width set in this way, fine contaminants (particles) enter the flow path of the fluid in the semiconductor production process and have a large effect on the product yield. The particles have to be made one-quarter of the line pitch (in the case of the process for 2014, 12 nm) or less. Members which maintain the cleanliness of the fluid while causing it to flow have great meaning.

In the constant flow valve which is disclosed in U.S. Pat. No. 6,805,156B2, a plurality of diaphragms which are arranged coaxially are configured so as to move together with respect to the pressure of the controlled fluid. At a valve seat, which is present at an inflow part side, a valve element which moves together with the diaphragms operates to open and close the valve. Due to these, the differential pressure in the constant flow valve is adjusted whereby the amount of outflow of the controlled fluid can be controlled to a predetermined flow amount. Further, the flow structure keeps the controlled fluid from pooling, enables the differential structure to be simply adjusted, and enables good response.

However, when controlling flow in the range of small flow amounts (rates), it is necessary to make the valve element advance and retract by a slight valve lift (opening degree). In such a constant flow valve, a plurality of diaphragms are linked by a shaft part, and the shaft part is inserted to the inside of the flow path at which the valve seat is formed. For this reason, operation of the valve element at the time of control is liable to cause the valve seat and valve element to slide against each other.

In the flow control system which is disclosed in US 2007/0056640A1, when a change of pressure occurs at the primary side fluid, the first pressure control valve part enables the secondary side of the first pressure control valve part to be maintained at the predetermined pressure and the flow amount to be controlled. On the other hand, if pressure fluctuation occurs at the secondary side fluid, the second pressure control valve part enables the primary side of the second pressure control valve part to be maintained at the predetermined pressure and the flow amount to be controlled. Therefore, even if a change of pressure occurs at the primary side or secondary side of the flow control system, it is possible to realize a stable of fluid flow amount at a high precision.

However, in the above flow control system, if the outflow of fluid is stopped etc. at the secondary side, the fluid pressure inside the flow control system will rise. At that time, the first pressure control valve part is liable to rapidly close, whereby the valve element is liable to strongly strike the valve seat of the first pressure control valve part.

In a conventional constant flow valve or flow control system, due to the above such operations, there is a concern over the possibility of the valve seat and the valve element etc. unexpectedly contacting and generating fine particles. For this reason, a device is sought which can supply fluid by a small flow amount at a high precision and which can maintain a high cleanliness.

Furthermore, if it were possible to satisfy the above demands and change a setting to a desired flow amount and possible to maintain a constant flow amount even after the above change, there could be progress in consolidation of devices. In particular, if there were a device which realized a constant flow amount in the range of small flow amounts and control of the flow amount itself, the feed of fluid could be made even easier to manage than before and, further, the cleanliness of the fluid could be maintained better. Therefore, a new device which realizes a constant flow amount in a fluid flow amount and control of the flow amount itself within a single device has been demanded.

As related art, see the above U.S. Pat. No. 6,805,156B2 (corresponding to Japanese Patent No. 4022438 and EP 1321841B1) and US 2007/0056640A1 (corresponding to Japanese Patent Publication No. 2007-102754A).

SUMMARY OF THE INVENTION

The present invention was made in consideration of this point and provides a flow control valve which suppresses unexpected contact between a valve seat and valve element etc. to maintain a constant flow amount (flow rate) in a state with a higher cleanliness of the fluid and further enables a change in the setting of the range of flow amount of the flowing fluid to promote consolidation of devices and provides a flow control system which uses the same.

That is, the aspect of the invention of claim 1 relates to a flow control valve which comprises a valve body part which has a pressure differential device part which is provided in a flow path between an inflow side chamber which is connected to an inflow part of a controlled fluid and an outflow side chamber which is connected to an outflow part of the controlled fluid and which has a valve seat which is formed at the outflow side chamber, a first diaphragm which is arranged at the inflow side chamber, which partitions the inflow side chamber into a first chamber which contacts the controlled fluid and a second chamber which becomes a back surface side of the first chamber and does not contact the controlled fluid, and which receives fluid pressure in the first chamber and is biased to the first chamber side by a constant pressure at all times by a biasing means, and a second diaphragm which is arranged at the outflow side chamber, which partitions the outflow side chamber into a third chamber which contacts the controlled fluid and a fourth chamber which becomes a back surface side of the third chamber and does not contact the controlled fluid, which receives fluid pressure in the third chamber, and has a valve element which advances and retracts with respect to the valve seat, the second chamber is formed with a first moving part which advances and retracts together with the first diaphragm, and the fourth chamber is formed with a second moving part which advances and retracts together with the second diaphragm, the second chamber and the fourth chamber have formed between them a connecting chamber, the connecting chamber has arranged in it an intermediate transmission member which engages with the first moving part and the second moving part and transmits fluctuation of one moving part to the other moving part, and advance or retraction of the first diaphragm and the second diaphragm due to a pressure difference before and after the pressure differential device part causes the valve element to advance or retract with respect to the valve seat and maintain the flow amount of the controlled fluid constant, the pressure differential device part is formed with a pressure differential opening part, and a pressure differential control valve element which controls the flow amount of the controlled fluid which passes through the pressure differential device part by advancing and retracting with respect to the pressure differential opening part and a pressure differential control valve element advancing/retracting means which makes the pressure differential control valve element advance and retract are provided.

The aspect of the invention of claim 2 relates to a flow control valve according to claim 1 wherein the first moving part and the second moving part are respectively comprised of rod-shaped members, a back end of the first moving part and a first end of the intermediate transmission member are engaged through a slanted surface which is formed at least at one of the same, and a back end of the second moving part and a second end of the intermediate transmission member are engaged through a slanted surface which is formed at least at one of the same.

The aspect of the invention of claim 3 relates to a flow control valve according to claim 1 wherein the first moving part and the second moving part are respectively comprised of rod-shaped members and wherein the intermediate transmission member is provided with a plurality of ball members.

The aspect of the invention of claim 4 relates to a flow control valve according to claim 1 wherein the biasing means is a spring.

The aspect of the invention of claim 5 relates to a flow control valve according to claim 1 wherein the pressure differential control valve element advancing/retracting means is a motor.

The aspect of the invention of claim 6 relates to a flow control valve according to claim 1 wherein the pressure differential control valve element advancing/retracting means is pneumatic air.

The aspect of the invention of claim 7 relates to a flow control valve according to claim 1 wherein the pressure differential control valve element advancing/retracting means is a screw member.

The aspect of the invention of claim 8 relates to a flow control valve according to claim 1 wherein the pressure differential opening part is formed as a flat-shaped pressure differential valve seat and a front end of the pressure differential control valve element which faces the pressure differential valve seat is also formed as a flat-plate shaped flat front end part.

The aspect of the invention of claim 9 relates to a flow control system which is provided with a flow control valve according to claim 1, a flow detecting part of a controlled fluid, and a processing part, wherein the flow control valve and the flow detecting part are connected to a fluid pipe between a supply part of the controlled fluid and a fluid mixing part of the controlled fluid.

The aspect of the invention of claim 10 relates to the flow control system according to claim 9 wherein a control part which generates a signal which controls the pressure differential control valve element advancing/retracting means is provided.

The aspect of the invention of claim 11 relates to the flow control system according to claim 9 wherein the processing part performs feedback control based on a measured value of a flow meter of the flow detecting part.

Summarizing the advantageous effects of the invention, according to the flow control valve according to the aspect of the invention of claim 1, there is provided a flow control valve which comprises a valve body part which has a pressure differential device part which is provided in a flow path between an inflow side chamber which is connected to an inflow part of a controlled fluid and an outflow side chamber which is connected to an outflow part of the controlled fluid and which has a valve seat which is formed at the outflow side chamber, a first diaphragm which is arranged at the inflow side chamber, which partitions the inflow side chamber into a first chamber which contacts the controlled fluid and a second chamber which becomes a back surface side of the first chamber and does not contact the controlled fluid, and which receives fluid pressure in the first chamber and is biased to the first chamber side by a constant pressure at all times by a biasing means, and a second diaphragm which is arranged at the outflow side chamber, which partitions the outflow side chamber into a third chamber which contacts the controlled fluid and a fourth chamber which becomes a back surface side of the third chamber and does not contact the controlled fluid, which receives fluid pressure in the third chamber, and has a valve element which advances and retracts with respect to the valve seat, the second chamber is formed with a first moving part which advances and retracts together with the first diaphragm, and the fourth chamber is formed with a second moving part which advances and retracts together with the second diaphragm, the second chamber and the fourth chamber have formed between them a connecting chamber, the connecting chamber has arranged in it an intermediate transmission member which engages with the first moving part and the second moving part and transmits movement of one moving part to the other moving part, and advance or retraction of the first diaphragm and the second diaphragm due to a difference of pressure before and after the pressure differential device part causes the valve element to advance or retract with respect to the valve seat and maintain the flow amount (flow rate) of the controlled fluid constant, the pressure differential device part is formed with a pressure differential opening part, and a pressure differential control valve element which controls the flow amount of the controlled fluid which passes through the pressure differential device part by advancing and retracting with respect to the pressure differential opening part and a pressure differential control valve element advancing/retracting means which makes the pressure differential control valve element advance and retract are provided, so it is possible to suppress unexpected contact between the valve seat and the valve element etc., maintain a constant flow amount in a state of higher cleanliness of the fluid, and enable change of setting of the range of flow amount of the flowing fluid and consolidation of devices.

According to the flow control valve of the aspect of the invention of claim 2, there is provided the aspect of the invention of claim 1 wherein the first moving part and the second moving part are respectively comprised of rod-shaped members, a back end of the first moving part and a first end of the intermediate transmission member are engaged through a slanted surface which is formed at least at one of the same, and a back end of the second moving part and a second end of the intermediate transmission member are engaged through a slanted surface which is formed at least at one of the same, so it is possible to smoothly transmit movement of one moving part to another moving part by the intermediate transmission member.

According to the flow control valve according to the aspect of the invention of claim 3, there is provided the aspect of the invention of claim 1 wherein the first moving part and the second moving part are respectively comprised of rod-shaped members and wherein the intermediate transmission member is provided with a plurality of ball members, so it is possible to more reliably transmit movement of one moving part to another moving part.

According to the flow control valve according to the aspect of the invention of claim 4, there is provided the aspect of the invention of claim 1 wherein the biasing means is a spring, so it is possible to use an inexpensive and simple structure to bias the first diaphragm.

According to the flow control valve according to the aspect of the invention of claim 5, there is provided the aspect of the invention of claim 1 wherein the pressure differential control valve element advancing/retracting means is a motor, so it is possible to precisely reproduce the amount of advance or retraction of the pressure differential control valve element.

According to the flow control valve according to the aspect of the invention of claim 6, there is provided the aspect of the invention of claim 1 wherein the pressure differential control valve element advancing/retracting means is pneumatic air, so it is possible to improve the response of the pressure differential control valve element in advancing or retracting.

According to the flow control valve according to the aspect of the invention of claim 7, there is provided the aspect of the invention of claim 1 wherein the pressure differential control valve element advancing/retracting means is a screw member, so it is possible to streamline the members relating to the adjustment of the valve lift and simplify the structure.

According to the flow control valve according to the aspect of the invention of claim 8, there is provided the aspect of the invention of claim 1 wherein the pressure differential opening part is formed as a flat-shaped pressure differential valve seat and a front end of the pressure differential control valve element which faces the pressure differential valve seat is also formed as a flat-plate shaped flat front end part, so it is possible to realize control of the flow amount in the range of small flow amounts and possible to prevent contact of the valve element with the valve seat side due to offset of the axis.

According to the flow control system according to aspect of the invention of claim 9, there are provided a flow control valve according to claim 1, a flow detecting part of a controlled fluid, and a processing part, wherein the flow control valve and the flow detecting part are connected to a fluid pipe between a supply part of the controlled fluid and a fluid mixing part of the controlled fluid, so the system as a whole can be made smaller in size. Further, the number of members which contact the controlled fluid is kept down and the controlled fluid can be easily maintained in cleanliness.

According to the flow control system according to aspect of the invention of claim 10, there is provided the aspect of the invention of claim 9 wherein a control part which generates a signal which controls the pressure differential control valve element advancing/retracting means is provided, so it is possible to smoothly control the pressure differential control valve advancing/retracting means.

According to the flow control system according to the aspect of the invention of claim 11, there is provided the aspect of the invention of claim 9 wherein the processing part performs feedback control based on a measured value of a flow meter of the flow detecting part, so it is possible to immediately respond to changes in flow amount which occur at the secondary side (downstream side) of the flow control valve so as to adjust the flow amount of the controlled fluid and to enable flow of the controlled fluid by a constant flow amount at all times.

BRIEF DESCRIPTION OF THE DRAWINGS

FIG. 6 is an enlarged view of main parts near the pressure differential control valve element of the first embodiment.

DESCRIPTION OF THE PREFERRED EMBODIMENTS

Figure 1:
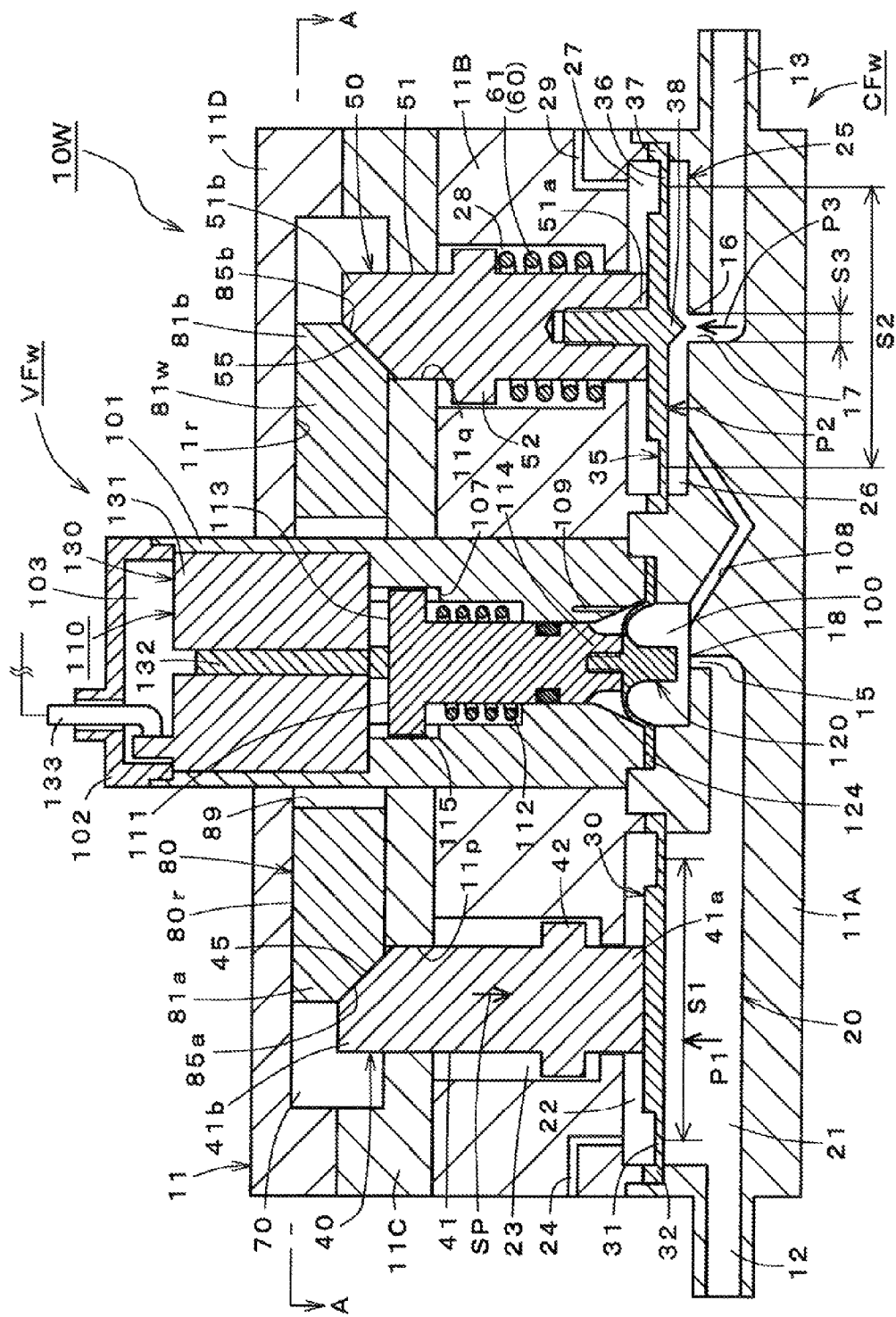
FIG. 1 is a vertical cross-sectional view of a flow control valve according to a first embodiment.

Flow control valves 10W, 10X, 10Y, and 10Z of different embodiments which are explained and illustrated in the present invention are mainly arranged in fluid pipelines of semiconductor production plants, semiconductor production systems, etc. and are used for control of the flow of fluids. Specifically, the flow control valves are valves which are provided with the functions of realizing constant flow amounts (flow rates) of flow of ultrapure water which is used for cleaning silicon wafers etc. and hydrofluoric acid, hydrogen peroxide solution, ammonia water, hydrochloric acid, and other chemicals which are used for various types of treatment. Further, at the same type as this, the flow control valves are valves which enable the flow amounts of the fluids which flow through them to be changed to desired ranges of flow amounts.

That is, the flow control valves of the present invention are classified as valves which are provided with the two different types of functions of the function of maintaining a constant flow amount and the function of variable control in a single valve. From this, the number of locations of installation becomes smaller. Further, since the functions which were previously separated between two valves are combined, the piping of the controlled fluid is streamlined and the controlled fluid is raised in cleanliness. In particular, the flow control valves of the present invention are suitable for control of controlled fluid for cleaning by the single wafer system. Below, embodiments will be explained focusing on the structure of the flow control valve 10W as a first embodiment.

The flow control valve 10W of the first embodiment has mainly two portions: a constant flow function part CFw which is responsible for the constant flow amount function of maintaining a constant fluid flow amount and a variable flow function part VFW which can perform control to change to the desired range of flow amount. For the valve body part 11, first diaphragm 30, second diaphragm 35, etc. which are included in the constant flow function part CFw and for the pressure differential control valve element (venturi constriction control valve element) 120 of the variable flow function part VFW and other main members, a property of not being corroded by the controlled fluid and not affecting the cleanliness of the controlled fluid is sought. For this reason, the main component members of the flow control valve 10W are formed by PTFE, PFA, PVDF, or another fluororesin or stainless steel or another corrosion resistant metal or a combination of these or other materials with a high corrosion resistance and chemical resistance. In particular, for the members at parts which contact the controlled fluid, resin materials are used.

The illustrated flow control valve 10W is worked and shaped by being cut from blocks of a fluororesin. The flow control valves 10X, 10Y, and 10Z of the later mentioned second to fourth embodiments are also formed from similar blocks of a fluororesin considering the point of not having an effect on the cleanliness of the controlled fluid.

The flow control valve 10W will first be explained starting from the configuration of the constant flow function part CFw. As shown in FIG. 1, the valve body part 11 has a pressure differential device part (venturi constriction part) 15 which is provided in a flow path between an inflow side chamber 20 which is connected to an inflow part 12 of the controlled fluid and an outflow side chamber 25 which is connected to an outflow part 13 of the controlled fluid and a valve seat 16 which is formed at the outflow side chamber 25. This valve body part 11 is formed by a combination of a plurality of body blocks 11A, 11B, 11C, and 11D. Further, the pressure differential device part 15 causes a loss in the fluid pressure in the flow path to cause a differential pressure in the fluid pressures of the inflow side chamber 20 and the outflow side chamber 25. Reference numeral 17 in the figure is an outflow opening part which connects the outflow side chamber 25 and the outflow part 13.

In the valve body part 11 of the embodiment, the body block 11A is formed with the inflow part 12, outflow part 13, pressure differential device part 15, and valve seat 16. Further, the pressure differential device part 15 is formed with a pressure differential opening part (venturi constriction opening part) 18. The body block 11A and the body block 11B are combined to thereby form the inflow side chamber 20 and the outflow side chamber 25. Further, the body block 11C and the body block 11D are combined to thereby form a connecting chamber 70.

The inflow side chamber 20 is partitioned by the first diaphragm 30 into a first chamber 21 which becomes the side which contacts the controlled fluid and a second chamber 22 which becomes the back surface side of the first chamber 21 and becomes the side which does not contact the controlled fluid. The first diaphragm 30 of this embodiment is comprised of a thin moving film part 31 which becomes the diaphragm surface and an outer circumference part 32 which is arranged at the outer circumference of the moving film part 31. The first diaphragm 30 is connected to a first moving part 40 which is arranged at the second chamber 22 side. The outer circumference part 32 is clamped between the body block 11A and the body block 11B to be fastened to a predetermined position. The illustrated first diaphragm 30 and first moving part 40 are not mechanically connected, but contact (abut against) each other.

The first chamber 21 is formed at the body block 11A. The flow path of the fluid from the inflow part 12 to the pressure differential device part 15 is configured by the first chamber 21. The second chamber 22 is formed at the body block 11B. A cylinder part 23 which can make a piston part 42 of the first moving part 40 advance and retract is formed at the second chamber 22. In the figure, reference numeral 24 is a breathing hole which is connected to the second chamber 22.

The first moving part 40 is a rod-shaped member 41. A front end 41a abuts against the first diaphragm 30, while a back end 41b is arranged passing through the cylinder part 23 of the second chamber 22 and sticking out into the connecting chamber 70. The first moving part 40 advances and retracts in accordance with movement of the first diaphragm 30. The rod-shaped member 41 (back end 41b) of the first moving part 40 is held by being inserted into a holding part 11p of the body block 11C which forms the second chamber 22. Therefore, the advancing and retracting movements of the first moving part 40 become movements in the front-back direction with respect to the first diaphragm 30 (on the paper surface, up-down direction).

The outflow side chamber 25 is partitioned by the second diaphragm 35 into a third chamber 26 which becomes the side which contacts the controlled fluid and a fourth chamber 27 which becomes the back surface side of the third chamber 26 and which becomes the side not contacting the controlled fluid. The second diaphragm 35 of this embodiment is comprised of a thin moving film part 36 which becomes the diaphragm surface and an outer circumference part 37 which is arranged at the outer circumference of the moving film part 36. The second diaphragm 35 is connected to the second moving part 50 which is arranged at the fourth chamber 27 side. The outer circumference part 37 is clamped between the body block 11A and body block 11B to be fastened.

The third chamber 26 is formed at the body block 11A. The controlled fluid flows through the pressure differential device part 15 and a control valve chamber 100 in that order and then flows into a coitmunicating flow path 108 which is connected to the third chamber 26. Therefore, the flow path of the fluid to the outflow part 13 through the communicating flow path 108 and outflow opening part 17 is configured by the third chamber 26. The fourth chamber 27 is formed at the body block 11B. The cylinder part 28 which enables advance and retraction of the piston part 52 of the second moving part 50 is formed by the fourth chamber 27. In the figure, reference numeral 29 is a breathing hole which is connected to the fourth chamber 27.

The second moving part 50 is comprised of a rod-shaped member 51. The front end 51a of the rod-shaped member 51 is connected to the second diaphragm 35. The back end 51b of the rod-shaped member 51 is arranged passing through the cylinder part 28 of the fourth chamber 27 and sticking out into the connecting chamber 70. In the figure, the second diaphragm 35 and the second moving part 50 are mechanically connected by screwing them together etc. This second moving part 50 advances and retracts linked with the operation of the second diaphragm 35. The rod-shaped member 51 of the second moving part 50 (back end 51b of same) is held inserted in a holding part 11q of the body block 11C which forms the fourth chamber 27. Therefore, the advancing and retracting movements of the second moving part 50 become movements in the front-back direction with respect to the second diaphragm 35 (on the paper surface, up-down direction).

Further, the second diaphragm 35 is provided with a valve element 38. The second diaphragm 35 receives the fluid pressure of the controlled fluid in the third chamber 26 and makes the valve element 38 advance and retract with respect to the valve seat 16. The valve element 38 is a projecting part which is formed sticking out toward the valve seat 16 side. In the present embodiment, it is formed in a tapered shape. The valve element 38 never contacts the valve seat 16 and closes the outflow opening part 17 (closes the valve), but forms a suitable clearance with it at all times. Of course, the shape of the valve element 38 which is formed at the second diaphragm 35 is not limited to the illustrated conical shape and is suitably a columnar member etc.

As will be easily understood from the partitioning into the inflow side chamber 20 and outflow side chamber 25 by the first diaphragm 30 and second diaphragm 35, the portions which contact the controlled fluid which flows through the flow path are limited. For this reason, the controlled fluid which flows through the inside of the flow control valve of the present invention is maintained at a high cleanliness.

The connecting chamber 70, as shown in FIG. 1, is formed bridging the second chamber 22 of the inflow side chamber 20 (cylinder part 23) and the fourth chamber 27 of the outflow side chamber 25 (cylinder part 28). Inside the connecting chamber 70, an intermediate transmission member 80 is arranged. The intermediate transmission member 80 engages with the first moving part 40 and second moving part 50 and transmits movement which occurs at one moving part 40 (or 50) to the other moving part 50 (or 40). The intermediate transmission member 80 of the first embodiment is comprised of a rectangular (frame) rod-shaped member 81w (see FIG. 2) which slides inside the connecting chamber 70 in the left-right direction (direction perpendicular to direction of advance or retraction of first moving part 40 or second moving part 50).

At the time of operation of the intermediate transmission member 80, if the intermediate transmission member 80 ends up rising up due to the advancing or retracting movement (up-down movement) of the first moving part 40 or second moving part 50, the amount of movement is no longer suitably transmitted. Therefore, in the illustrated embodiment, the intermediate transmission member 80 is housed in the connecting chamber 70. At the same time, a moving sliding part 80r of the intermediate transmission member 80 (rod-shaped member 81w) is contacted by the block sliding part 11r of the body block 11D whereby the intermediate transmission member 80 is kept from rising up. For this reason, in the illustrated intermediate transmission member 80, movement of the rod-shaped member 81w is limited at all times to the left-right direction.

As will be understood from the illustration, the back end 41b of the first moving part 40 and a first end 81a of the intermediate transmission member 80 are engaged through a slanted surface 45 (85a) which is formed at least at one of the same. Further, the back end 51b of the second moving part 50 and a second end 81b of the intermediate transmission member 80 are engaged through a slanted surface 55 (85b) which is formed at least at one of the same. In the first embodiment, both the back end 41b of the first moving part 40 and the first end 81a of the intermediate transmission member 80 are formed with slanted surfaces 45 (85a), while both the back end 51b of the second moving part 50 and the second end 81b of the intermediate transmission member 80 are formed with slanted surfaces 55 (85b). Further, each of the slanted surfaces 45, 55, 85a, and 85b has a slant angle of 45°.

Figure 2:
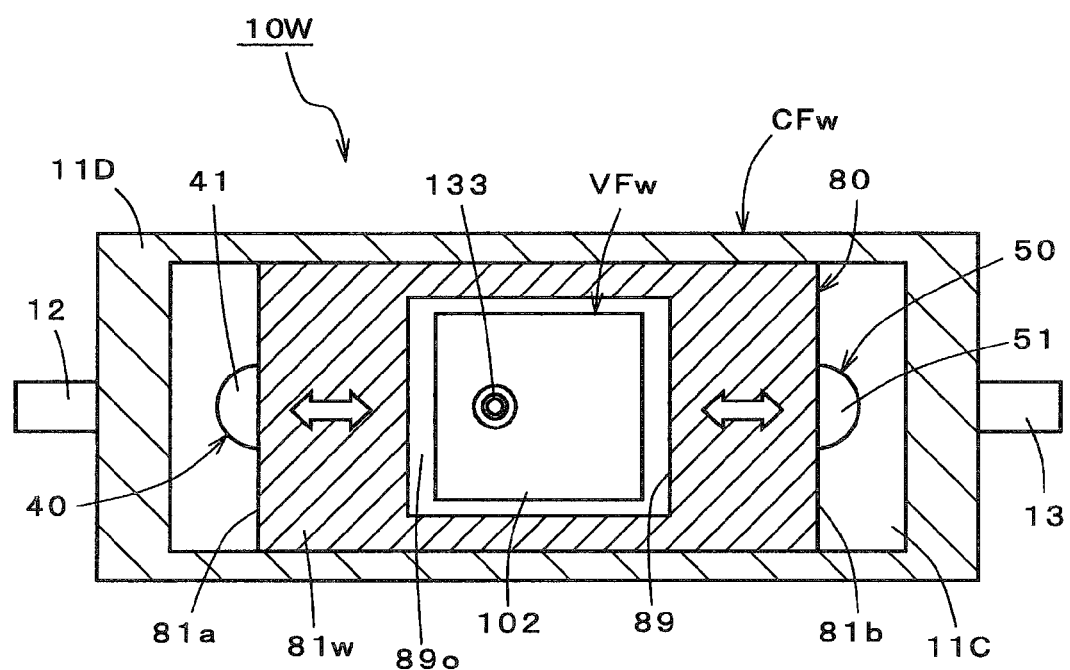
FIG. 2 is a schematic horizontal cross-sectional view along a line A-A of FIG. 1.

The transmission of movement of the moving parts 40 and 50 by the intermediate transmission member 80 will be explained. FIG. 2 corresponds to a horizontal cross-section at the part A-A of FIG. 1. However, the variable flow function part VFW is omitted in the illustration. The intermediate transmission member 80 of the first embodiment is a rod-shaped member 81w which is provided with a rectangular hole part 89. Further, the variable flow function part VFW is arranged in the rectangular hole part 89 and fastened by the body blocks 11B, 11C, and 11D. The rectangular hole part 89 has a larger clearance 890 than the variable flow function part VFw in the longitudinal direction which constitutes the direction of movement of the rod-shaped member 81w of the intermediate transmission member 80. Therefore, even if the variable flow function part VFw is arranged inside the rectangular hole part 89, the variable flow function part VFw never contacts the rectangular hole part 89, so the intermediate transmission member 80 can move by smoothly sliding without being affected by the variable flow function part VFW. Of course, the intermediate transmission member 80 is not limited to the form of a rod-shaped member 81w which is provided with a rectangular hole part 89. It is enough that it be a structure which avoids the variable flow function part VFW while enabling movement of the moving parts 40 and 50 to be transmitted to each other.

Figure 3:
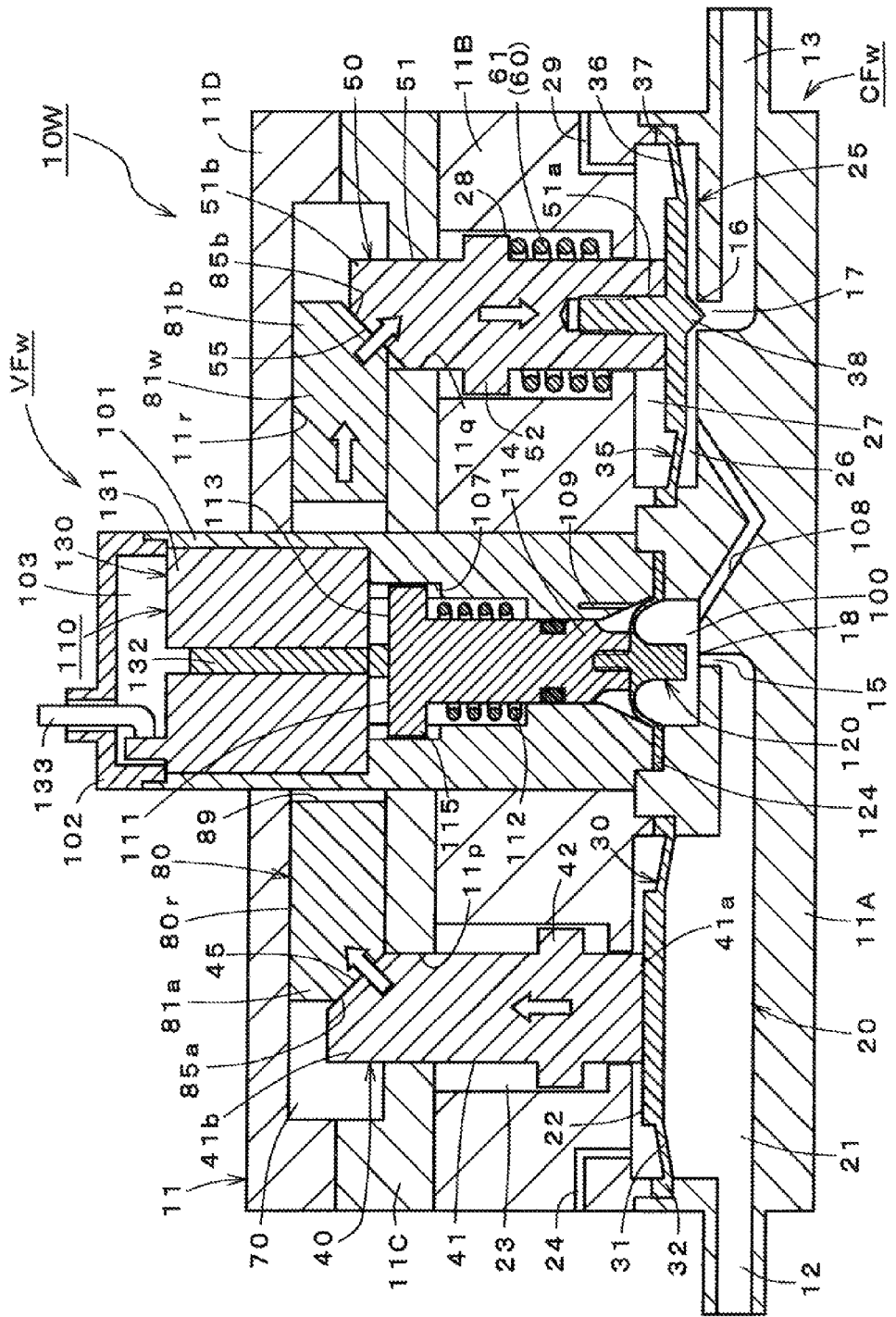
FIG. 3 is a vertical cross-sectional view of a state where a first diaphragm of the first embodiment has advanced.

FIG. 3 shows an example of the case of the intermediate transmission member 80 transmitting movement of the first moving part 40 to the second moving part 50. First, the first moving part 40 retracts. At this time, the intermediate transmission member 80 (rod-shaped member 81w) slides through the slanted surface 45 (85a) and the block sliding part 11r at the top of the connecting chamber 70. Further, the intermediate transmission member 80 (rod-shaped member 81w) moves while pushed inward in the direction of the second moving part 50 side (see arrow marks in figure). Next, the intermediate transmission member 80 moves in the direction of the second moving part 50 side, whereby the second moving part 50 slides via the slanted surface 55 (85b) to be pushed inward to the second diaphragm 35 side and advances (see arrow marks in figure).

Figure 4:
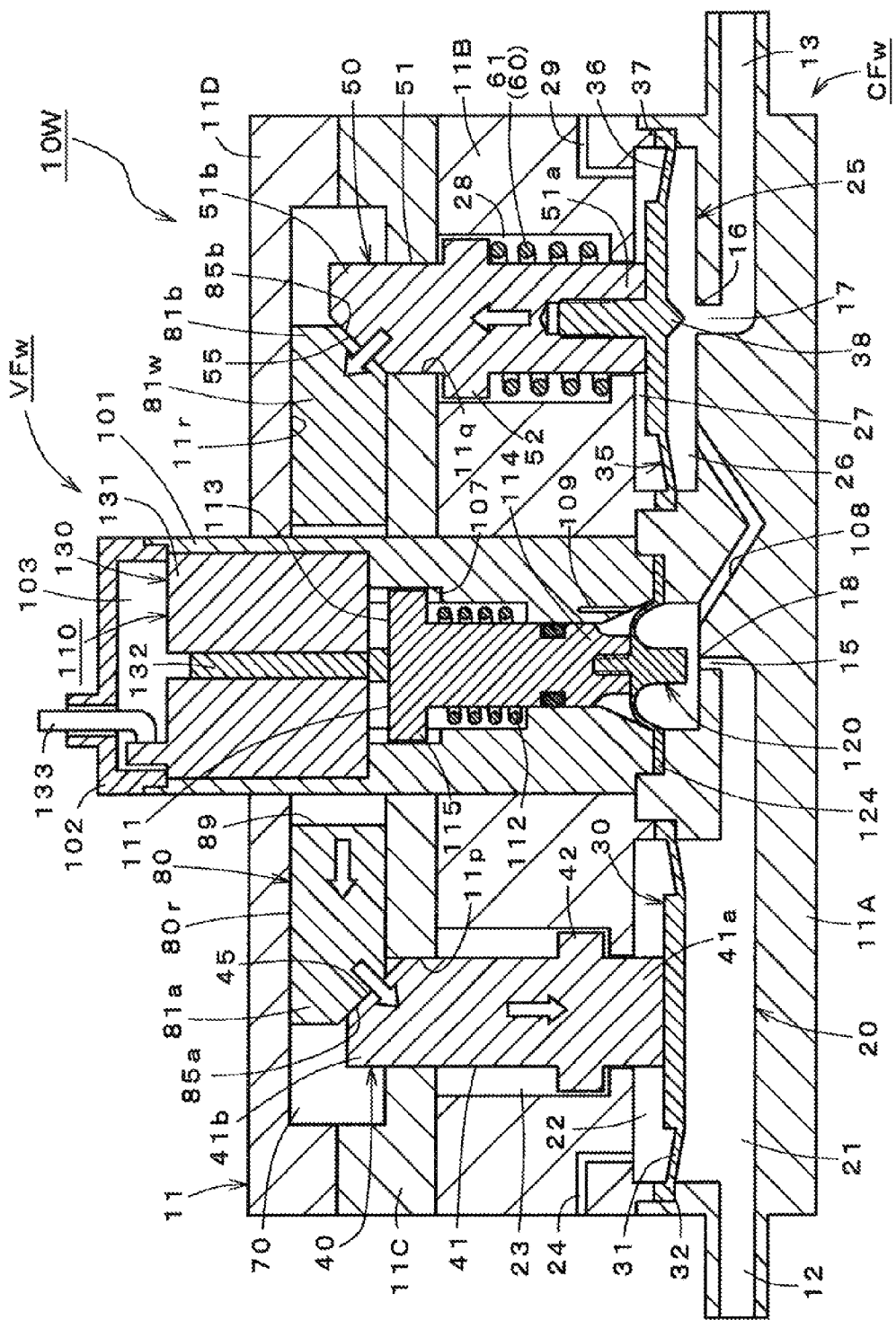
FIG. 4 is a vertical cross-sectional view of a state where the first diaphragm of the first embodiment has retracted.

FIG. 4 shows an example of the case where the intermediate transmission member 80 (rod-shaped member 81w) transmits movement of the second moving part 50 to the first moving part 40. First, the second moving part 50 retracts. At that time, the intermediate transmission member 80 slides through the slanted surface 55 (85b) and the block sliding part 11r at the top of the connecting chamber 70. Further, the intermediate transmission member 80 moves in the direction of the first moving part 40 side (left side in figure), whereby the first moving part 40 slides through the slanted surface 45 (85a) and is pushed inward to the first diaphragm 30 side and advances.

Further, the slant angle of each of the slanted surfaces 45, 55, 85a, and 85b is formed to 45°. For this reason, movement of one moving part 40 (50) is smoothly transmitted to the other moving part 50 (40) by the intermediate transmission member 80. In the flow control valves 10X and 10Y of the later explained second and third embodiments as well, the slant angles of the engaging locations are 45°.

As explained above, the first moving part 40 and intermediate transmission member 80 or the second moving part 50 and intermediate transmission member 80 are configured to transmit movement by sliding with respect to each other. From this, a material which reduces the frictional resistance is preferable. In accordance with need, grease or a coating etc. may be applied to reduce the friction. Due to this, friction among the members 40, 50, and 80 is reduced and movement can be more smoothly transmitted. Therefore, in the flow control valve 10W, as shown in FIGS. 3 and 4, in the first chamber 21 and third chamber 26 which straddle the pressure differential device part 15 to become the front and back of the same, the first diaphragm 30 and second diaphragm 35 advance or retract along with change in the fluid pressure of the controlled fluid.

For example, as shown in FIG. 3, if a rise in the primary side pressure of the flow control valve 10W causes the fluid pressure of the controlled fluid at the first diaphragm 30 side to become higher, the first moving part 40 retracts together with the first diaphragm 30. This movement is transmitted through the intermediate transmission member 80 (rod-shaped member 81w) to the second moving part 50. Due to this, a load in the direction of advance (valve seat 16 direction) is applied from the first diaphragm 30 to the second diaphragm 35. Receiving the descent of the second moving part 50, the second diaphragm 35 and valve element 38 advance to the valve seat 16 whereupon the outflow opening part 17 is reduced in valve lift (opening degree).

Conversely, as shown in FIG. 4, if a rise in the secondary side pressure of the flow control valve 10W causes the fluid pressure of the controlled fluid at the second diaphragm 35 side to become higher, a force acts on the second diaphragm 35 side pushing back against the load from the first diaphragm 30. The second diaphragm 35 and second moving part 50 retract from the valve seat 16 together with the valve element 38 whereby the outflow opening part 17 is increased in valve lift. Further, movement of the second moving part 50 is transmitted through the intermediate transmission member 80 to the first moving part 40. Through the first moving part 40, the first diaphragm 30 advances.

In this way, the first and second diaphragms 30 and 35 receive the difference in pressure of the controlled fluid before and after the pressure differential device part 15. Further, movements of the first moving part 40 and second moving part 50 are transmitted to each other through the intermediate transmission member 80. As a result, the movement which is caused is accurately reflected in the advancing and retracting movements of the second diaphragm 35 and valve element 38 whereby the valve element 38 advances and retracts with respect to the valve seat 16. Therefore, the valve lift (opening amount) of the outflow opening part 17 is adjusted, and as a result, the flow amount of the controlled fluid which passes through the flow control valve 10W is maintained at a constant flow amount.

At the constant flow function part CFw of the illustrated flow control valve 10W, the first diaphragm 30 receives the pressure of the controlled fluid in the first chamber 22. Simultaneously, the first chamber 21 side is biased by the biasing means 60 by a constant pressure at all times. Specifically, the biasing means 60 of the present embodiment is a spring 61 (coil spring). The spring 61 is arranged in the cylinder part 28 of the fourth chamber 27. Due to this spring 61, the second moving part 50 constituted by the rod-shaped member 51 is biased in a direction away from the outflow side chamber 25. This being so, as illustrated and already explained, the movement which accompanies bias by the spring is transmitted to the first diaphragm 30 in accordance with the order of engagement shown as the second moving part 50 (rod-shaped member 51), intermediate transmission member 80 (rod-shaped member 81w), and first moving part 40 (rod-shaped member 41). Accordingly, a constant load is applied to the first diaphragm 30 at the inflow side chamber 20 side at all times.

In the first embodiment, the biasing means 60 (spring 61) is arranged at the second moving part 50 side, so the elasticity of the spring 61 causes the piston part 52 to be lifted up and the second diaphragm 35 which is connected to the piston part 52 to be lifted up. This being so, force acts on the valve element 38 causing it to separate from the valve seat 16 at all times. Unintentional contact of the valve element 38 with the valve seat 16 is avoided. Further, by employing a biasing means 60 constituted by the spring 61, the mechanism for biasing becomes simpler and the cost can be reduced by that extent.

The relationship between the flow amount of the controlled fluid and the fluid pressure at the constant flow function part CFw of the flow control valve 10W will be explained with reference to FIG. 1. At the time of the following explanation, the fluid pressure which is applied to the first diaphragm 30 is designated as "P1", the fluid pressure which is applied to the second diaphragm 35 is designated as "P2", the fluid pressure at the outflow part 13 side which is applied to the second diaphragm 35 is designated as "P3", the load which is applied by the biasing means 60 to the first diaphragm (spring load of spring 61) is designated as "SP", the effective pressure receiving surface area of the first diaphragm 30 is designated as "S1", the effective pressure receiving surface area of the second diaphragm 35 is designated as "S2", and the surface area of the outflow opening part 17 of the valve seat 16 is designated as "S3". Further, the flow amount of the controlled fluid is expressed as "Q", a flow coefficient which is set by the valve lift surface area of the pressure differential device part 15 is expressed by "A", and a differential pressure (P1-P2) which caused before and after the pressure differential device part 15 is expressed as "ΔP". Note that, the effective pressure receiving surface area S1 of the first diaphragm 30 and the effective pressure receiving surface area S2 of the second diaphragm 35 are made equal (S1=S2). Further, the effective pressure receiving surface area at a diaphragm is the surface area of the moving part, that is, the moving film part of the diaphragm surface comprised of a thin film part, which effectively receives pressure.

The force which causes the first diaphragm 30 to retract (F1) and the force which causes the second diaphragm 35 to retract (F2) are expressed by the following formulas:

$$F1 = S1 \times P1$$

$$F2 = (S2-S3) \times P2 + S3 \times P3 + SP$$

Here, by making the surface area S3 of the outflow opening part 17 of the valve seat 16 very small, the fluid pressure P3 at the outflow part 13 side which is applied to the second diaphragm 35 becomes negligible. From these, the balance formula (F1=F2) becomes as follows:

$$S1 \times P1 = S1 \times P2 + SP$$

$$S1(P1-P2) = SP$$

$$\Delta P = SP/S1$$

As will be understood from the above formula, the differential pressure ($\Delta P$) due to the pressure differential device part 15 of the flow control valve 10W is determined by the load (SP) of the biasing means 60 and the effective pressure receiving surface areas of the first diaphragm 30 and the second diaphragm 35 (S1=S2). Therefore, the flow amount (Q) of the fluid is determined by the differential pressure ($\Delta P$), so can be expressed by the following formula:

$$Q = A \times \sqrt{(\Delta P)} \qquad (i)$$
$$= A \times \sqrt{(SP/S1)}$$

Therefore, at the constant flow function part CFw of the flow control valve 10W, by changing the load (SP) of the biasing means 60, it becomes possible to change the differential pressure ($\Delta P$) and change the flow amount (Q) of the fluid. Note that, as the method for changing the amount of bias of the biasing means 60, there are the methods of changing the springs themselves and manual operation or motor drive etc. to change the spring load.

Another feature of the flow control valve 10W, that is, the variable flow function part VFw, has the function of adjusting the valve lift (amount of opening) at the pressure differential device part 15 between the first chamber 21 and the third chamber 26. Using the above-mentioned FIGS. 1, 5, 6, etc., the variable flow function part VFw of the flow control valve 10W will be explained.

In the flow control valve 10W of the illustrated embodiment, the control valve chamber 100 is formed at the body block 11A. The control valve chamber 100 is a space which links parts so that controlled fluid which flows in from the pressure differential device part 15 which is connected to the first chamber 21 runs through the communicating flow path 108 which is connected to the third chamber 26. This control valve chamber 100 is provided with a pressure differential control valve element 120.

Figure 6:
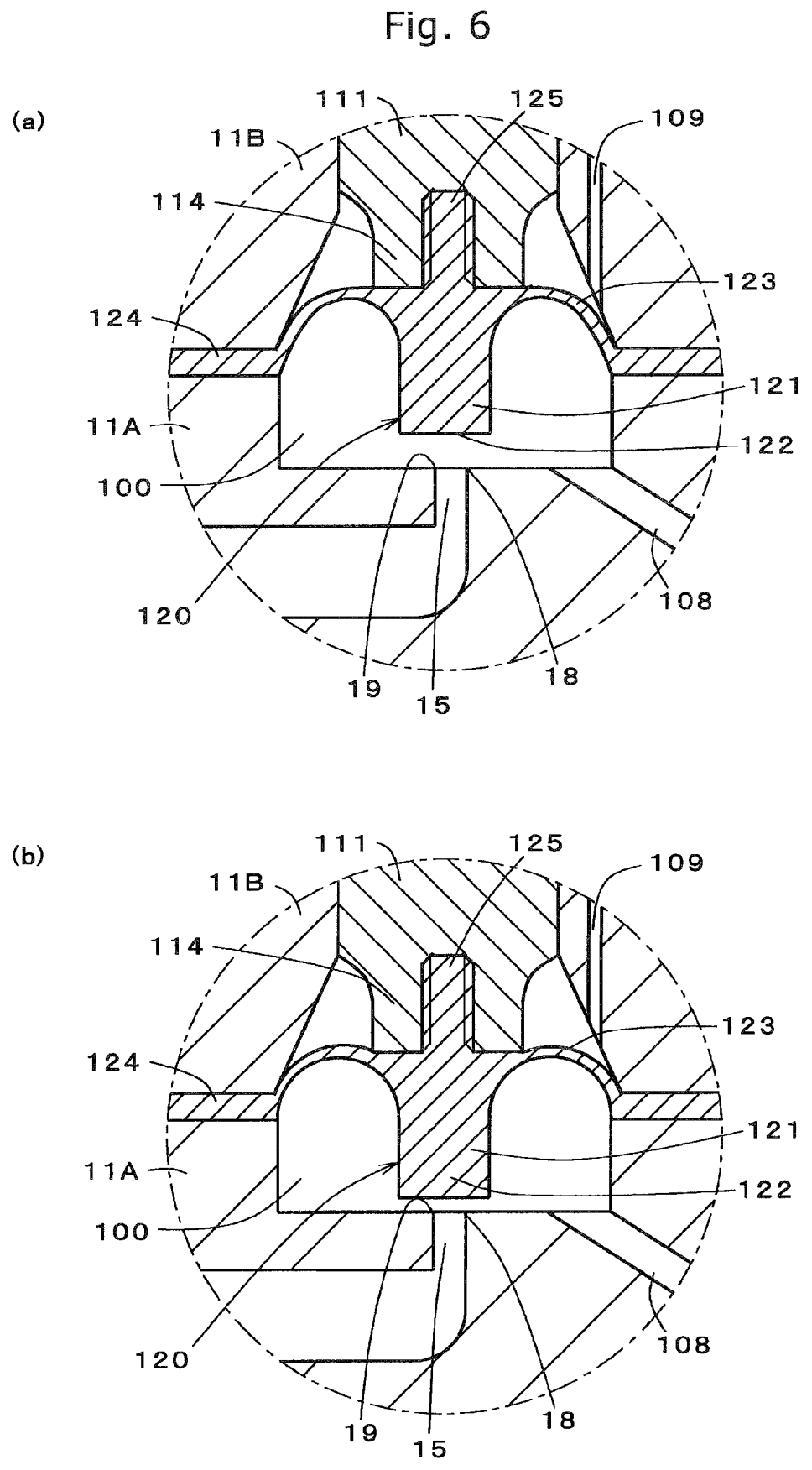

Furthermore, as shown in the enlarged view near the pressure differential control valve element 120 of FIG. 6, the location at which the pressure differential device part 15 is connected to the control valve chamber 100 is the pressure differential opening part 18. This pressure differential opening part 18 is the pressure differential valve seat (venturi constriction valve seat) 19 which corresponds to the pressure differential control valve element 120. The pressure differential valve seat 19 is on the same plane as the bottom surface of the control valve chamber 100 at the body block 11A side and is formed to a flat shape. The pressure differential control valve element 120 is a diaphragm structure equipped with a valve which is provided with a front end part (seal part) 121 which faces the pressure differential valve seat 19, a pressure differential control valve thin film part 123, a pressure differential control valve outer circumference part 124, etc. To match with the flat shape of the pressure differential valve seat 19, the front end part 121 of the pressure differential control valve element 120 also forms a flat-plate front end part 122 which is formed in a flat plate shape. The flat-plate front end part 122 has a diameter larger than the diameter of the opening of the pressure differential opening part 18. The pressure differential control valve outer circumference part 124 is clamped between the body block 11A and the housing block 101 and fastened at a predetermined position.

As shown in the embodiments, along with the pressure differential valve seat 19, the reason why the pressure differential control valve element 120 is made the flat-plate front end part 122 is to enable control of the flow amount of controlled fluid in the range of small flow amounts of 150 ml/min or less, more particularly 5 to 20 ml/min. For example, in a conventional needle valve, when making the members smaller in size to enable control of the flow amount in the range of small flow amounts, due to the tolerances of the members themselves, axial offset at the time of production or assembly, or other factors, the valve element easily contacts the valve seat side. This being so, the valve seat and the valve element are liable to be shaved and the opening part of the valve seat is liable to change in size resulting in a change in the fluid flow amount. As opposed to this, as shown in the illustrated embodiments, both the valve element side and the valve seat side are made flat shapes so as to avoid the above-mentioned problem. Rather, when control of the flow amount of the controlled fluid in the range of small flow amounts is not desired and using the device for ordinary flow amount control, an existing needle valve etc. may be utilized.

The pressure differential control valve element 120 is joined with the bottom end of the adjustment piston part 111, constituted by the piston joining part 114, through the joining part 125. For convenience in accurately controlling the front end part 121 of the pressure differential control valve element 120, these are mechanically connected by screwing them together etc. The air which builds up in the space at the back side of the pressure differential control valve thin film part 123 at the pressure differential control valve element 120 flows in and out through the breathing hole 109. For convenience in illustration, the terminal end of the breathing hole 109 is communicated with the depth side on the drawing sheet (not shown).

Returning to FIG. 1, as will be grasped from that figure etc., the variable flow function part VFw is provided with a pressure differential control valve advancing/retracting means (venturi constriction control valve advancing/retracting means) 110. The pressure differential control valve advancing/retracting means 110 makes the pressure differential control valve element 120 advance into and retract from the pressure differential opening part 18. In the variable flow function part VFW of the flow control valve 10W of the first embodiment which is shown in FIGS. 1 to 5, the pressure differential control valve advancing/retracting means 110 is a motor 130.

Inside the housing space part 103 of the housing block 101 which is inserted inside the body block 11B, an adjustment piston part 111 which is accompanied with a piston part spring 112 is inserted. A motor 130 is arranged at the upper side of this. The piston driven part 113 of the top end of the adjustment piston part 111 is connected to the motor shaft 132 of the motor 130 to be able to rotate. Further, after the different members are housed, the housing block 101 is covered by the seal block 102. The piston driven part 113 of the top end of the adjustment piston part 111 is provided with a projecting ridge part 115 for stopping rotation of the adjustment piston part 111. Further, the adjustment piston part 111 is inserted in the housing groove part 107 of the housing block 101 side.

The motor 130 used may be any so long as able to precisely reproduce the amount of advance or retraction of the front end part 121 (flat-plate front end part 122) of the pressure differential control valve element 120. For example, a known stepping motor or servo motor is preferably used. In addition, an ultrasonic motor may be used. The present embodiment schematically illustrates a known stepping motor which turns a motor shaft 132 by a stator, rotor, or other drive part 131. The screw and other members which are related to the rotation of the motor shaft 132 are self-evident, so illustration will be omitted. The amount of rotation with respect to the drive part 131 of the motor 130 is controlled through the processing part 7 and the control part 8 which are connected with wiring cables 133. These will be explained by the later FIG. 10. Note that, various types of motors may also be provided with encoders etc. (not shown).

Figure 5:
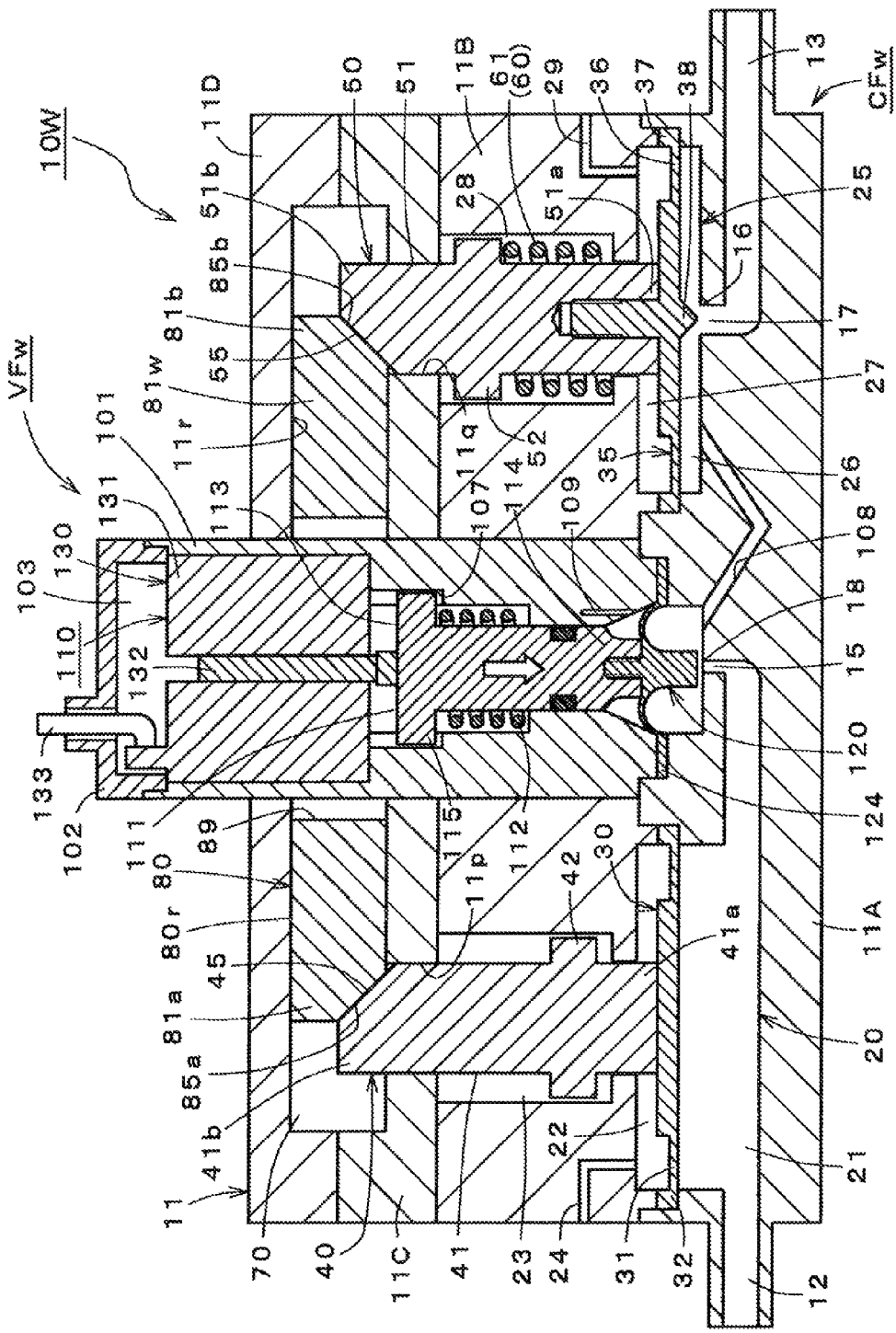
FIG. 5 is a vertical cross-sectional view of a state where a pressure differential control valve element of the first embodiment has advanced.

The advancing and retracting movement of the pressure differential control valve element 120 will be explained together with FIGS. 1, 5, and 6. The state with a large valve lift (opening amount) of the pressure differential opening part 18 corresponds to FIG. 1 and FIG. 6(*a*). A suitable distance is maintained between the front end part 121 of the pressure differential control valve element 120 (flat-plate front end part 122) and the pressure differential valve seat 19.

Next, at the drive part 131 of the motor 130, the motor shaft 132 turns by a predetermined amount whereupon the adjustment piston part 111 is pushed down through the motor shaft 132. This being so, linked with the adjustment piston part 111, the pressure differential control valve element 120 also advances. As shown in FIG. 5 and FIG. 6(*b*), the front end part 121 (flat-plate front end part 122) approaches the pressure differential valve seat 19 more and the pressure differential opening part 18 becomes smaller in valve lift (opening amount). Therefore, the flow amount itself of the controlled fluid which passes through the pressure differential device part 15 of the flow control valve 10W is suppressed.

Again, when increasing the flow amount, at the drive part 131 of the motor 130, the motor shaft 132 rotates by a predetermined amount in the opposite direction, the adjustment piston part 111 is pushed up through the motor shaft 132, and, linked with the adjustment piston part 111, the pressure differential control valve element 120 retracts. The front end part 121 (flat-plate front end part 122) separates from the pressure differential valve seat 19 and returns again to the distance which is shown in FIG. 1 and FIG. 6(*a*). In this way, by suitably operating the drive part 131 of the motor 130, the pressure differential control valve element 120 can advance or retract to the optimum position. The pressure differential opening part 18 is adjusted in valve lift and the flow amount of the controlled fluid which passes through the pressure differential device part 15 is easily adjusted to increase or decrease.

The relationship between the flow amount (Q) of the fluid and the differential pressure (ΔP), as explained above, is shown as the formula (i).

$$Q = A \times \sqrt{(\Delta P)} \qquad (i)$$

In the formula (i), when trying to change the differential pressure (ΔP) to adjust the flow amount (Q), the flow amount (Q) changes proportionally to a square root of the differential pressure (ΔP). For this reason, even if changing the differential pressure (ΔP), it is difficult to change the flow amount (Q) to an extent commensurate with the change in the differential pressure (ΔP). Further, adjustment of the differential pressure (ΔP) is accompanied with adjustment of the spring etc., so is not necessarily simple.

However, in formula (i), the flow amount (Q) is in a simple proportional relationship with respect to the flow coefficient (A). This being so, by changing the flow coefficient (A), it is possible to effectively change the flow amount (Q). That is, the matter which corresponds to the adjustment of the flow coefficient (A) in the formula is the amount of valve lift of the pressure differential opening part 18.

Therefore, the flow control valve 10W is provided with a variable flow function part VFw in addition to the constant flow function part CFw, so enables the flow coefficient to be relatively easily changed. Accordingly, adjustment by change in a broader range of flow amounts becomes possible. Further, the motor 130 is used for the pressure differential control valve advancing/retracting means 110 which adjusts the valve lift of the pressure differential opening part 18, so easy change to the targeted range of flow amounts becomes possible.

Figure 7:
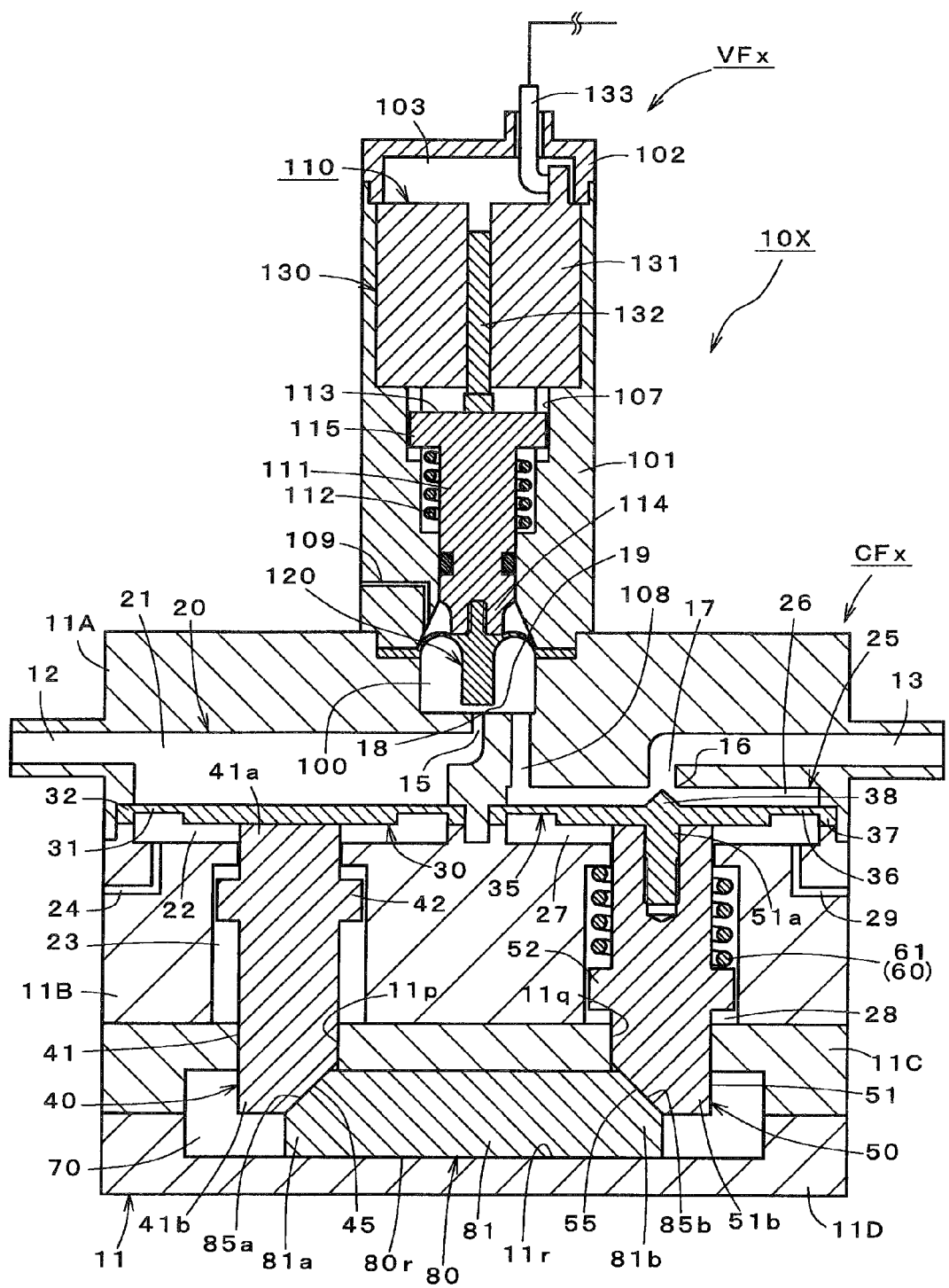
FIG. 7 is a vertical cross-sectional view of a flow control valve according to a second embodiment.

FIG. 7 is a vertical cross-sectional view of the flow control valve 10X of the second embodiment. In the flow control valve 10X as well, there are two portions: a constant flow function part CFx which is responsible for the constant flow amount function of maintaining a constant flow amount of fluid and a variable flow function part VFx which can perform control to change to the desired range of flow amount. As will be understood from the illustration, the flow control valve 10X of the second embodiment is reverse in position of arrangement of the variable flow function part compared with the flow control valve 10W of the first embodiment.

In the constant flow function part CFx and variable flow function part VFx, reference numerals the same as the flow control valve 10W of the first embodiment show the same members. For this reason, the explanations are the same, so will be omitted. In the intermediate transmission member 80 of the constant flow function part CFx, rather than a rectangular shape, a simple rod-shaped member 81 is used. Even if the shapes differ, the actions are the same in the point of linking the advancing and retracting movements between the first diaphragm and second diaphragm.

In the flow control valve 10X of the second embodiment as well, the pressure differential control valve element 120 advances and retracts through the pressure differential control valve advancing/retracting means 110 (motor 130). Due to this, the pressure differential opening part 18 which is connected to the pressure differential device part 15 is adjusted in valve lift (amount of opening).

Figure 8:
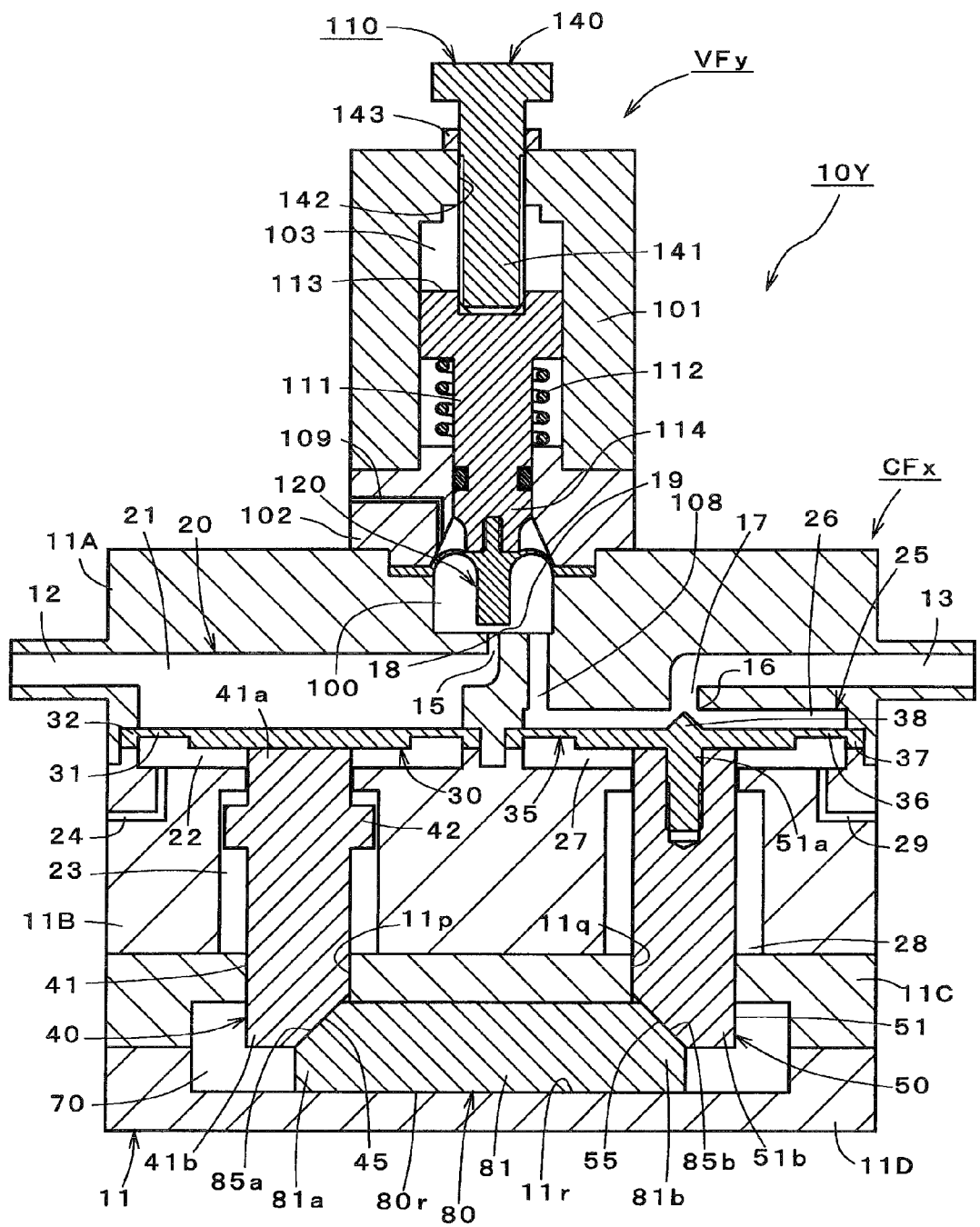
FIG. 8 is a vertical cross-sectional view of a flow control valve according to a third embodiment.

FIG. 8 is a vertical cross-sectional view of a flow control valve 10Y of a third embodiment. In the flow control valve 10Y, there are two portions: a constant flow function part CFx which is responsible for the constant flow amount function of maintaining a constant flow amount of fluid of the same structure as the flow control valve 10X and a variable flow function part VFy which can perform control to change to the desired range of flow amount. Regarding the constant flow function part CFx, the same reference numerals as the flow control valve 10W of the first embodiment and the flow control valve 10X of the second embodiment show the same members. For this reason, the explanations are the same, so will be omitted.

The variable flow function part VFy of the flow control valve 10Y of the third embodiment is an example provided with a pressure differential control valve advancing/retracting means 110 constituted by a screw member (bolt member) 140. In the flow control valve 10Y, the pressure differential control valve element 120 is clamped by the seal block 102 against the body block 11A and fastened at a predetermined position. Further, the adjustment piston part 111 is housed together with the piston part spring 112 in the housing block 101 and connected to the seal block 102 for fastening. In the screw hole part 142 of the housing block 101, a thread 141 of the screw member 140 is inserted. Reference numeral 143 indicates a fastening nut.

The piston driven part 113 of the adjustment piston part 111 is pushed in against the piston part spring 112 by turning the adjustment screw 141 (turning it forward). As a result, the pressure differential control valve element 120 approaches the pressure differential valve seat 19 of the pressure differential opening part 18. If turning the adjustment screw 141 in reverse (turning it in reverse), the piston part spring 112 extends and separates from the pressure differential valve seat 19 of the pressure differential opening part 18 along with the pressure differential control valve element 120 which is joined with the piston joining part 114 of the adjustment piston part 111. In this way, it is possible to obtain the desired valve lift (amount of opening) of the pressure differential opening part 18 in accordance with the rotation of the adjustment screw 141. By employing a screw member 140 for the pressure differential control valve advancing/retracting means 110, it is possible to streamline the members related to the adjustment of the valve lift and simplify the structure.

Figure 9:
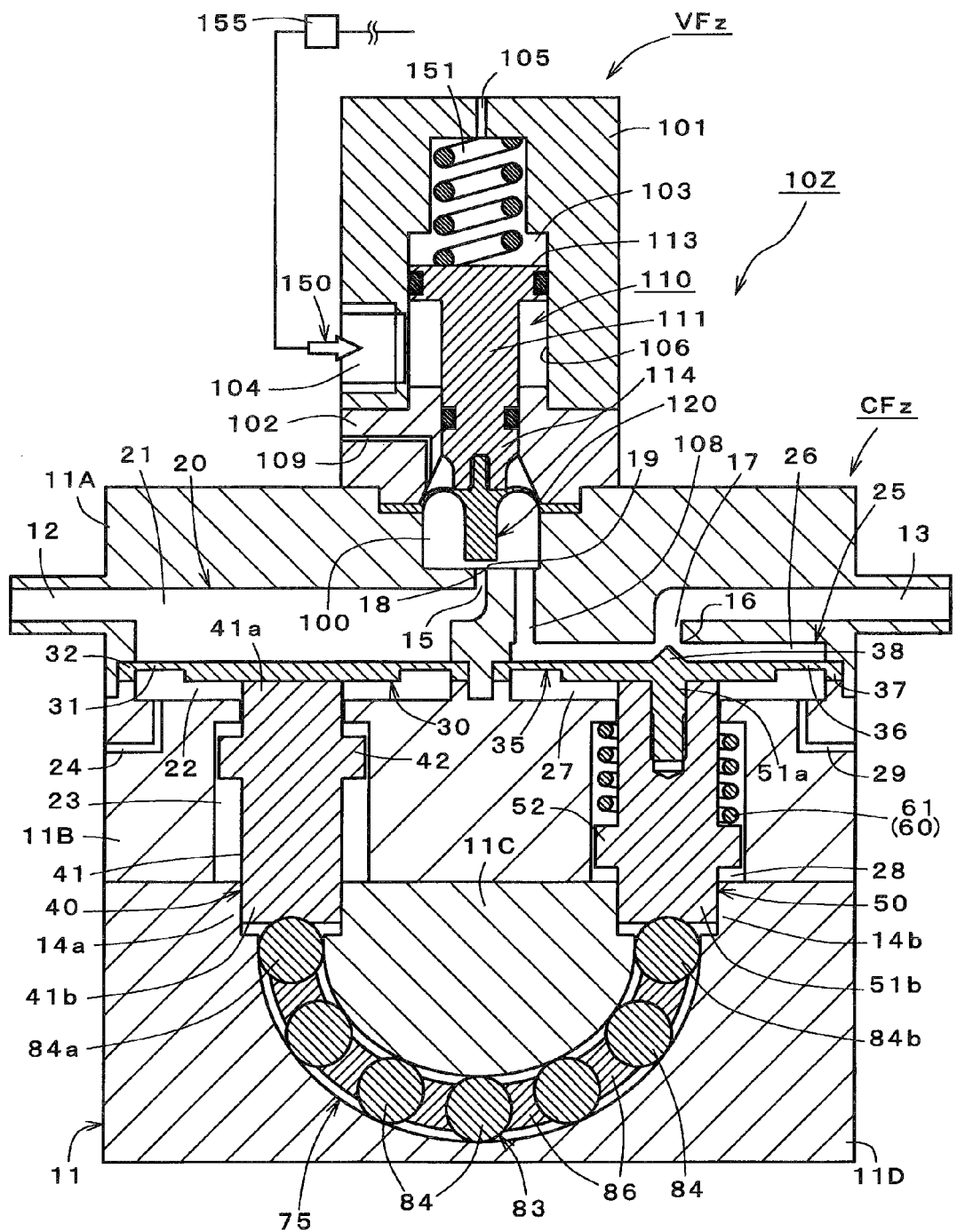
FIG. 9 is a vertical cross-sectional view of a flow control valve according to a fourth embodiment.

FIG. 9 is a vertical cross-sectional view of a flow control valve 10Z of a fourth embodiment. In the flow control valve 10Z, there are two portions: a constant flow function part CFz which is responsible for the constant flow amount function of maintaining a constant flow amount of fluid and a variable flow function part VFz which can perform control to change to the desired range of flow amount. The constant flow function part CFz is not provided with the intermediate transmission member 80 constituted by the rod-shaped member 81 such as with the constant flow function part CFw etc. which were explained up to here. The intermediate transmission member 83 is provided with a plurality of ball members 84.

The connecting chamber 75 in which the intermediate transmission member 83 is housed is formed in a pipe shape which is curved so as to connect both the second chamber 22 of the inflow side chamber 20 and the fourth chamber 27 of the outflow side chamber 25. As the arc shape of the connecting chamber 75, there are a semicircular shape, semielliptical shape, or other suitable U-shape. Further, while not shown, the connecting chamber 75 has a square or circular cross-sectional shape and is formed with a constant width across its entire length.

The first moving part 40 is comprised of a rod-shaped member 41. The front end 41a is connected to the first diaphragm 30. The back end 41b is arranged passing through the cylinder part 23 of the second chamber 22 and sticking out to the connecting chamber 70 side. This first moving part 40 advances and retracts together with the first diaphragm 30. The first moving part 40 (rod-shaped member 41) is limited by a first limit part 14a in the direction of linear movement before and after the first diaphragm 30. The first limit part 14a is a wall part which is formed at the body blocks 11C and 11D. The side part of the back end 41b of the first moving part 40 is held by the first limit part 14a to be able to slide.

The second moving part 50 is comprised of a rod-shaped member 51. The front end 51a is connected to the second diaphragm 35, while the back end 51b is arranged passing through the cylinder part 28 of the fourth chamber 27 and sticking out into the connecting chamber 70. This second moving part 50 advances and retracts together with the second diaphragm 35. The illustrated second diaphragm 35 and second moving part 50 are mechanically connected by screwing etc. Further, the second moving part 50 (rod-shaped member 51) is limited by a second limit part 14b in the direction of linear motion before and after the second diaphragm 35. The second limit part 14b is also a wall part which is formed at the body blocks 11C and 11D. The side part of the back end 51b of the second moving part 50 is held by the second limit part 14b to be able to slide.

The plurality of ball members 84 which form the intermediate transmission member 83 engage with the first moving part 40 and second moving part 50 and transmit movement of one moving part 40 (50) to the other moving part 50 (40). The plurality of ball members 84 are held at the inside walls of the connecting chamber 75 to be able to roll or slide and are lined up with each other inside the connecting chamber 75 from the back end 41b of the first moving part 40 to the back end 51b of the second moving part 50.

The transmission of movement of the moving parts 40 and 50 by the intermediate transmission member 83 will be explained next. When the intermediate transmission member 83 transmits movement of the first moving part 40 to the second moving part 50, first, the first moving part 40 retracts. At this time, the lined up ball members 84 move by being pushed in the direction of the second moving part 50 side (right side in figure) through the other ball member 84a which engages with the back end 41b of the first moving part 40. Further, by movement of the ball members 84, the second moving part 50 is pushed in to the second diaphragm 35 side and advances through the ball member 84b which engages with the back end 51b of the second moving part 50.

Conversely, when the intermediate transmission member 83 transmits movement of the second moving part 50 to the first moving part 40, first, the second moving part 50 retracts. At this time, the lined up ball members 84 are pushed inward in the direction of the first moving part 40 side (left side in figure) and move through the ball member 84b which is engaged with the back end 51b of the second moving part 50. Further, by movement of the ball members 84, the first moving part 40 is pushed inward to the first diaphragm 30 side and advances through the ball member 84a which is engaged with the back end 41b of the first moving part 40.

The first moving part 40 and second moving part 50 are limited by the first limit part 14a and the second limit part 14b so as to linearly move in the front-back direction. For this reason, even when moving engaged with the ball members 84, horizontal offset etc. do not occur and movement of one moving part 40 (50) can be transmitted to the other moving part 50 (40) without waste.

As explained above, the intermediate transmission member 83 (ball members 84) is configured to transmit movement by rolling or sliding in the connecting chamber 75, so a material with a low frictional resistance is preferable. Application of grease or a coating or other treatment also can reduce the wear. Due to this, unnecessary friction between the body blocks 11C and 11D and the intermediate transmission member 83 (ball members 84) is lightened and movement can be transmitted more smoothly.

In addition, as in the illustrated embodiment, a ball holding member (bearing retainer) 86 is interposed between the plurality of ball members 84 of the intermediate transmission member 83. By the ball holding member 86 being provided together with the ball members 84, the friction due to contact between the ball members 84 is reduced and the transmission efficiency rises.

The variable flow function part VFz of the flow control valve 10Z of the fourth embodiment is an example of use of pneumatic air (pressure adjusting gas) 150 as the pressure differential control valve advancing/retracting means 110. The adjustment piston part 111 is housed together with the piston part spring 112 inside the housing block 101 and connected and fastened to a seal block 102. The piston driven part 113 is a cross-sectional T-shape. The edges contact the inside wall 106 of the housing block 101. An inflow port 104 is formed at the housing block 101 which is connected to the seal block 102. Reference numeral 105 is a breathing hole.

By the pneumatic air 150 flowing in from the inflow port 104 to the housing space part 103 of the housing block 101, the adjustment piston part 111 acts against the piston part spring 112 in a direction compressing the spring in accordance with the inflow pressure. This being so, in the illustrated example, the pressure differential control valve element 120 is connected to the adjustment piston part 111, so the pressure differential control valve element 120 operates to separate from the pressure differential valve seat 19 of the pressure differential opening part 18 at all times. Conversely, when making the pressure differential control valve element 120 approach the pressure differential valve seat 19 more, it becomes possible to lower the inflow pressure of the pneumatic air 150.

The inflow pressure of the pneumatic air 150 is adjusted by an electropneumatic converter (electropneumatic regulator) 155. Control of the electropneumatic converter etc. will be explained with reference to FIG. 10. The flow control valve 10Z of the fourth embodiment uses pneumatic air 150 as the pressure differential control valve advancing/retracting means 110, so the amount of advance or retraction of the pressure differential control valve element 120 can be adjusted faster and by a better response.

In the flow control valves 10W, 10X, 10Y, and 10Z of the first embodiment to fourth embodiment which were illustrated and explained up to now, the constant flow function parts and the variable flow function parts in the flow control valves can be suitably recombined. For example, in the flow control valve 10W, the variable flow function part VFy or VFz may be changed to. Furthermore, the flow control valve of the present invention is not limited to the above embodiments. Part of the configuration can be suitably changed in a range not deviating from the gist of the invention.

Figure 10:
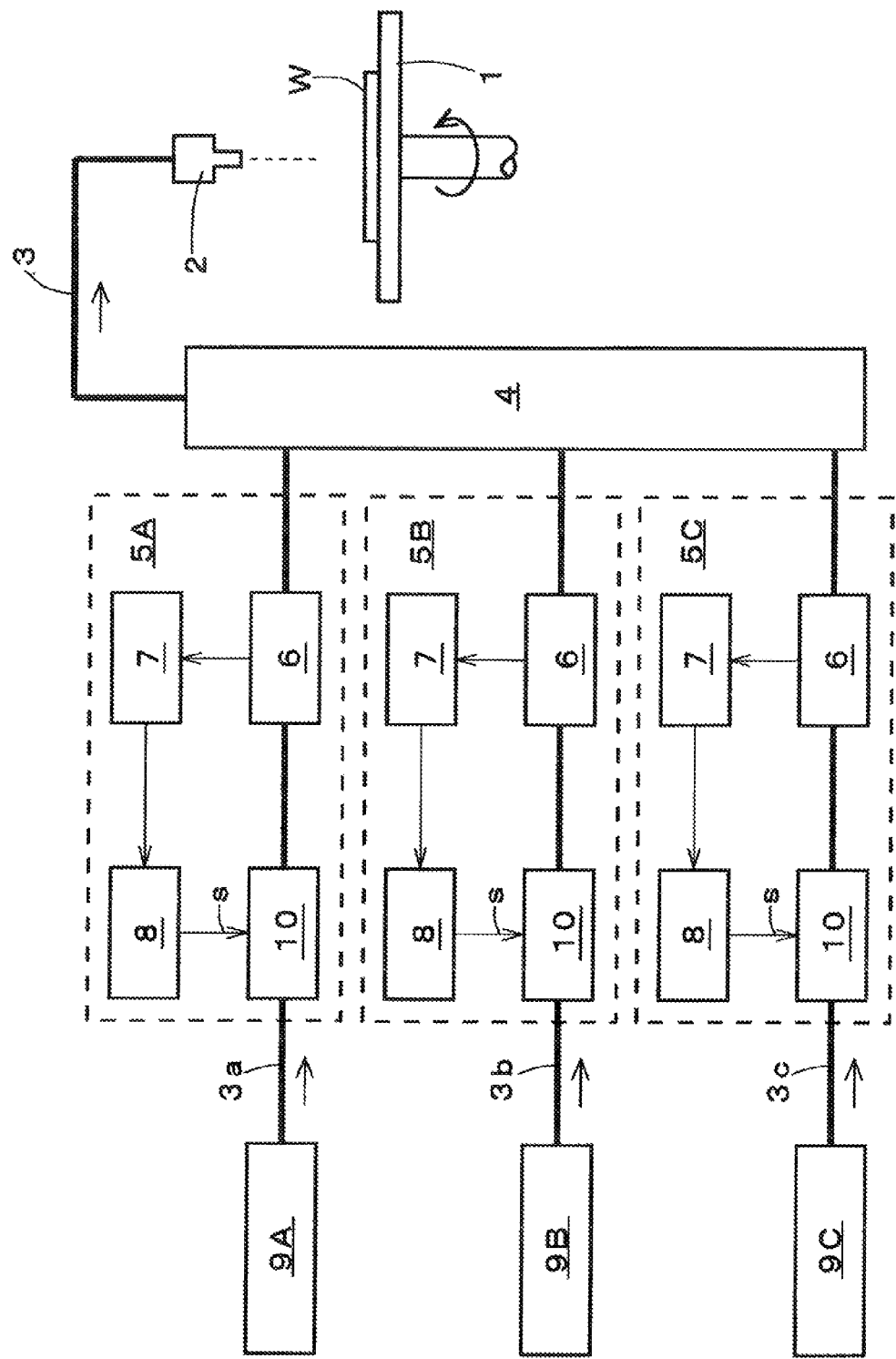
FIG. 10 is a schematic view of a substrate treatment system in which a flow control system of the present invention is incorporated.

From here, FIG. 10 will be used to explain a flow control system which incorporates the above explained flow control valve. The schematic view of FIG. 10 shows a single wafer type substrate treatment system which treats one silicon wafer W at a time. A silicon wafer W is placed on a turntable of a spin chuck 1. Directly above the silicon wafer W, a treatment solution nozzle 2 is provided for spraying a treatment solution. Treatment solution for cleaning the silicon wafer etc. is supplied through the fluid pipe 3 to the treatment solution nozzle 2.

The treatment solution is the controlled fluid which finished being explained with reference to the flow control valve and is ultrapure water, hydrofluoric acid, hydrogen peroxide solution, ammonia water, hydrochloric acid, etc. Different controlled fluids are stored in supply parts 9A, 9B, and 9C by type and are supplied to the fluid mixing part 4 through the fluid pipes 3a, 3b, and 3c which correspond to the supply parts. The supplied controlled fluids are uniformly mixed at the fluid mixing part 4 and pass through the fluid pipe 3 to the treatment solution nozzle 2. Further, flow control systems 5A, 5B, and 5C which control the supply of the controlled fluids, as illustrated, are connected to the pipelines of the fluid pipes 3a, 3b, and 3c. The different flow control systems correspond to the supply parts of the controlled fluids of the different types.

Each of the flow control systems 5A, 5B, and 5C is provided with a flow control valve 10, a flow detecting part 6 of the controlled fluid, and a processing part 7. Furthermore, a control part 8 is also provided which generates signals for controlling the pressure differential control valve element advancing/retracting means in the flow control valve. The flow control valve 10, flow detecting part 6, processing part 7, and control part 8 are connected by signal lines s. Therefore, if taking the flow control system 5A as an example, the flow control valve 10 and flow detecting part 6 are connected to the fluid pipe 3a between the supply part RA of the controlled fluid and the fluid mixing part 4 of the controlled fluid. Like in the illustrated flow control system, the only member which is related to the control of the flow amount of the controlled fluid is the flow control valve. For this reason, the device as a whole can be made smaller in size. Further, the number of members which contact the controlled fluid is suppressed and the cleanliness of the controlled fluid is easily maintained.

For the flow control valve 10, any of the illustrated and already explained 10W, 10X, and 10Z may be used. The flow detecting part 6 is a known flow meter which detects the flow amount of the secondary side (downstream side) of the flow control valve 10. For example, it is a differential pressure type flow meter, ultrasonic type flow meter, etc. The processing part 7 is a microcomputer, PLC (programmable logic controller), or other known processing device. The processing part 7 generates signals for control of the flow amount of the flow control valve 10 in accordance with instructions from the outside or changes in the measured value of the flow meter of the controlled fluid detected by the flow detecting part 6.

The control part 8 is a pulse generator, controller, driver, etc. which is required for driving a stepping motor, servo motor, etc. of the pressure differential control valve advancing/retracting means. When the pressure differential control valve advancing/retracting means is pneumatic air, the control part 8 is an electropneumatic converter. Pneumatic air which is adjusted to a predetermined pressure is supplied from the control part to a variable flow function part. The control part 8 is essential when using motor or pneumatic air as the pressure differential control valve advancing/retracting means in the flow control valve 10. In particular, this is important in smooth control of the amount of rotation of the motor of the pressure differential control valve advancing/retracting means, adjustment of the feed pressure of the pneumatic air, and other control of specific operations.

If giving an example of the flow of signals from the flow detecting part 6 to the flow control valve 10, the result generally becomes as follows: A change in the flow amount of the controlled fluid in the fluid piping is measured through the flow detecting part 6. That signal is sent to the processing part 7. The processing part 7 calculates the optimal advance/retraction position of the pressure differential control valve element 120 so as to obtain an valve lift of the pressure differential opening part 18 (pressure differential valve seat 19) which corresponds to that change in flow amount. Along with this, an operating signal for motor operation is generated. Further, the operating signal is sent from the processing part 7 to the control part 8. In the control part 8, specifically, a pulse signal for driving the motor is generated. This pulse signal is converted to a motor drive current. Further, the motor drive current is sent to the pressure differential control valve advancing/retracting means in the flow control valve 10, that is, the motor. Therefore, the motor rotates by a limited amount. In this way, the pressure differential control valve element 120 retracts by the optimum amount from the pressure differential opening part 18.

As will be understood from the flow of signals from the flow detecting part 6 to the flow control valve 10, the processing part 7 executes feedback control based on the measured value of the flow amount of the flow detecting part 6. Therefore, it is possible to immediately respond to a change in the flow amount which occurs at the secondary side (downstream side) of the flow control valve 10 to adjust the flow amount of the controlled fluid and enable a flow of controlled fluid by a constant flow amount at all times. In particular, the flow control valve 10 can also handle fluid in the range of small flow amounts. This is convenient for precise control of the controlled fluid. Note that, the processing part 7 and the control part 8 may be combined to form a processing control unit.

The flow control valve which is disclosed in the present invention can realize a constant flow amount by sensitively responding to changes in pressure of the flowing fluid and, further, can maintain the cleanliness of the fluid in a higher state. Simultaneously, a function of changing the range of fluid flow amount of the controlled fluid is provided. In addition, the flow control system which is provided with the flow control valve which is disclosed in the present invention is more advanced in consolidation of members and therefore can be made smaller in size. Therefore, it is perfect for the field of semiconductor production, fuel cells, and other applications where extremely precise control of the flow amount and high cleanliness are sought.

What is claimed is:

1. A flow control valve which comprises
   a valve body part which has a pressure differential device part which is provided in a flow path between an inflow side chamber which is connected to an inflow part of a controlled fluid and an outflow side chamber which is connected to an outflow part of the controlled fluid and which has a valve seat which is formed at said outflow side chamber,
   a first diaphragm which is arranged at said inflow side chamber, which partitions said inflow side chamber into a first chamber which contacts the controlled fluid and a second chamber which becomes a back surface side of said first chamber and does not contact the controlled fluid, and which receives fluid pressure in said first chamber and is biased to said first chamber side by a constant pressure at all times by a biasing means, and
   a second diaphragm which is arranged at said outflow side chamber, which partitions said outflow side chamber into a third chamber which contacts the controlled fluid and a fourth chamber which becomes a back surface side of said third chamber and does not contact the controlled fluid, which receives fluid pressure in said third chamber, and has a valve element which advances and retracts with respect to said valve seat,
   said second chamber is formed with a first moving part which advances and retracts together with said first diaphragm, and said fourth chamber is formed with a second moving part which advances and retracts together with said second diaphragm,
   said second chamber and said fourth chamber have formed between them a connecting chamber, said connecting chamber has arranged in it an intermediate transmission member which engages with said first moving part and said second moving part and transmits fluctuation of one of said moving part to the other of said moving part, and an advancement or a retraction of said first diaphragm and said second diaphragm due to a pressure fluctuation before and after said pressure differential device part causes said valve element to advance or retract with respect to said valve seat and maintain the flow amount of the controlled fluid constant,
   said pressure differential device part is formed with a pressure differential opening part, and
   a pressure differential control valve element which controls the flow amount of the controlled fluid which passes through said pressure differential device part by advancing and retracting with respect to said pressure differential opening part and
   a pressure differential control valve element advancing/retracting means which makes said pressure differential control valve element advance and retract.

2. The flow control valve according to claim 1 wherein said first moving part and said second moving part are respectively comprised of rod-shaped members, a back end of said first moving part and a first end of said intermediate transmission member are engaged through a slanted surface, and a back end of said second moving part and a second end of said intermediate transmission member are engaged through a slanted surface.

3. The flow control valve according to claim 1 wherein said first moving part and said second moving part are respectively comprised of rod-shaped members and wherein said intermediate transmission member is provided with a plurality of ball members.

4. The flow control valve according to claim 1 wherein said biasing means is a spring.

5. The flow control valve according to claim 1 wherein said pressure differential control valve element advancing/retracting means is a motor.

6. The flow control valve according to claim 1 wherein said pressure differential control valve element advancing/retracting means is pneumatic air.

7. The flow control valve according to claim 1 wherein said pressure differential control valve element advancing/retracting means is a screw member.

8. The flow control valve according to claim 1 wherein said pressure differential opening part is formed as a flat-shaped pressure differential valve seat and a front end of said pressure differential control valve element which faces said pressure differential valve seat is also formed as a flat-plate shaped flat front end part.

9. A flow control system which is provided with a flow control valve according to claim 1, a flow detecting part of a controlled fluid, and a processing part, wherein
   said flow control valve and said flow detecting part are connected to a fluid pipe between a supply part of the controlled fluid and a fluid mixing part of the controlled fluid.

10. The flow control system according to claim 9 wherein a control part which generates a signal which controls said pressure differential control valve element advancing/retracting means is provided.

11. The flow control system according to claim 9 wherein said processing part performs feedback control based on a measured value of a flow meter of said flow detecting part.

* * * * *